Inventors:
Lee Raymond Frandsen
Joseph Edmund Louis
By Hofgren, Wegner,
Allen, Stellman & McCord
Attys

3,455,184
TRANSMISSION
Lee Raymond Frandsen and Joseph Edmund Louis, Rockford, Ill., assignors to Sundstrand Corporation, a corporation of Delaware
Filed Dec. 27, 1967, Ser. No. 693,900
Int. Cl. F16h 47/04
U.S. Cl. 74—687                                   23 Claims

ABSTRACT OF THE DISCLOSURE

A hydraulic control circuit for a multiple range hydrostatic-differential transmission of the type having a first clutch engageable to provide a purely hydrostatic power flow and a second clutch for providing split power flow through both the hydrostatic portion of the drive and directly from the input shaft to the differential, an input shaft driven governor for normally controlling the displacement of one of the units and a pressure control for limiting the pressure of the system to control displacement at very low and idling speeds, and further including a differential lockout valve for preventing shifting of the transmission from a low speed mode to a high speed mode until the input shaft, or the connected prime mover, attains a predetermined minimum speed, and also including a synchronous indicator valve which is responsive to both input shaft speed and output shaft speed to provide a shifting signal when the speeds of the two shafts are substantially equal, and still further including a sequencing valve for actuating the clutches in sequential fashion so that the second clutch is engaged before the first clutch is disengaged to maintain the associated engine loaded throughout the shift from one mode to the other.

Background of the invention

This invention relates to an improvement over the copending application of William A. Ross, Ser. No. 636,818, filed May 8, 1967, and assigned to the assignee of the present invention. The hydrostatic drive and differential gearing schematic disclosed in this prior application is substantially the same as that disclosed herein, the improvement in the present construction being primarily in the hydraulic control circuit for controlling both the displacement of one of the hydraulic units and the two clutches which determine the mode of the transmission.

Basically, these transmissions have selectively operable power paths in low and high speed ranges with shifting between the speed ranges being effected by clutch means in which the clutching elements are inherently substantially synchronous at a predetermined displacement of one of the hydraulic units in the transmission. An input shaft is drivingly connected to one of the hydraulic units and selectively connectable by a clutch to one of the gears in the differential; the other hydraulic unit (operable as a motor and a pump) is drivingly connected to the control gear in the differential, a second clutch being provided for locking the differential so that power in the lower speed range is delivered entirely by the hydrostatic components. When the second clutch is disengaged and the first clutch engaged in the upper speed range the power is delivered in split paths mechanically and hydrostatically.

In the prior transmission a control circuit is provided consisting basically of an engine driven governor, including a fluid valve, for controlling the displacement of one of the hydraulic units to control transmission ratio. A shift valve is provided between the governor and the displacement control motor for one of the hydraulic units to effect a reversal of the fluid connections between the governor valve and the displacement motor when the associated hydraulic unit initially reaches maximum displacement causing a reversal of the displacement control motor so that it moves the variable displacement unit toward zero displacement. At the same time the shift valve reverses the fluid connections to the displacement control motor, and reverses the fluid connections to actuators for the clutches, thereby reversing the state of engagement of the clutches and changing the mode of the transmission from straight hydrostatic to differential-hydrostatic.

There is also provided in the prior transmission a zero pressure control valve and a neutral governor which control the transmission when the engine is in an idling speed range and override the effect of the main governor valve on the displacement control motor at this time to maintain the variable displacement unit at a displacement to provide a zero pressure, no output torque condition, similar to placing a gear control in neutral in a conventional automobile.

Summary of the invention

In accordance with the present invention a transmission is provided with an engine driven governor for normally controlling the displacement of one of the hydraulic units to control transmission ratio. Rather than effecting shifting when the displacement of the variable displacement hydraulic unit reaches a predetermined value, the present hydraulic control circuit includes a synchronous indicator valve which provides a shifting signal when the speed of the output shaft of the transmission equals or slightly exceeds the speed of the input shaft. This assures that synchronous shifting will be effected.

Also provided in the present control circuit is a differential lockout valve which prevents the delivery of a shifting signal to subsequent clutch actuation circuitry until the input shaft or engine speed exceeds a predetermined minimum level. The purpose of this is to prevent shifting from the low speed mode to the high speed mode at very low engine speeds.

In the prior transmission described above an undertaking to obtain simultaneous engagement of one clutch and disengagement of the other clutch when shifting from one mode to another sometimes resulted in unloading the engine temporarily. To eliminate this possibility there is provided in accordance with the present invention a sequencing valve, which responds to a shifting signal, for effecting the engagement of one clutch prior to the disengagement of the other clutch so that the engine remains loaded throughout the shift from one mode to the other.

While the main governor normally controls the displacement of the one hydraulic unit and hence the speed ratio of the transmission throughout the speed range, a system pressure responsive control is provided for controlling hydraulic unit displacement and transmission ratio, if desired, at low transmission output speeds. This pressure responsive control permits the operator to select a desired pressure limit in the hydraulic drive at low speeds and it will automatically control the displacement of the one hydraulic unit to limit this pressure. At higher speeds this pressure responsive control is ineffective and the main engine driven governor control takes over to control transmission ratio in accordance with the power setting made by the operator through the accelerator pedal, which is connected to bias the governor.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Description of the preferred embodiment

Figure 1:
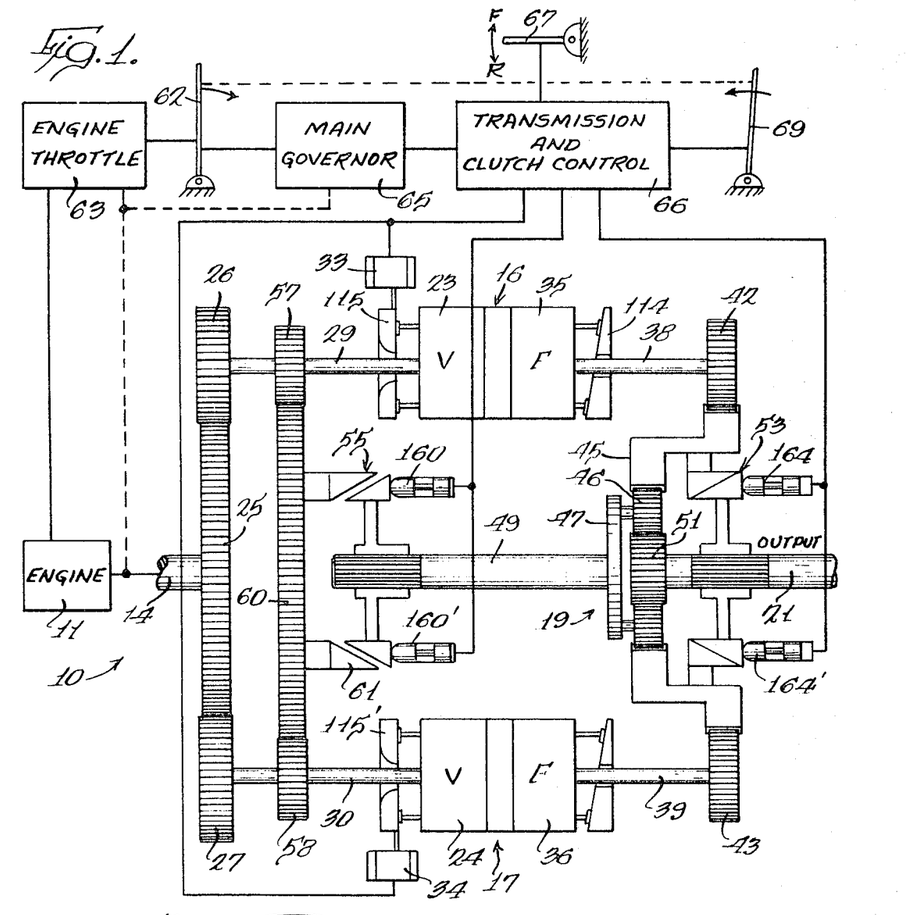
FIG. 1 is a schematic illustration of the present differential-hydrostatic transmission with the associated controls.

Referring to the drawings, and particularly FIG. 1, a differential-hydrostatic transmission 10 is shown driven by a suitable prime mover 11. The transmission 10 is particularly suitable for on-highway vehicles where high efficiency and performance are required over a wide speed range, and is also suitable for use in hard working, slow moving, so called off-highway vehicles.

Transmission 10 generally includes an input shaft 14 driven by engine 11, hydraulic transmission 16 and 17, gear differential 19 and output shaft 21. While the disclosure includes a showing of two hydraulic transmissions, it should be understood that the control of the present invention is fully applicable to a system utilizing a single hydraulic transmission or more than two.

The input shaft 14 is drivingly connected to variable displacement hydraulic units 23 and 24 in the hydraulic transmissions 16 and 17, respectively, through gear 25, gears 26 and 27 respectively, and shafts 29 and 30 respectively. The displacement of the variable displacement units 23 and 24 is controlled by displacement control motors 33 and 34 respectively. The transmissions 16 and 17 also include fixed displacement units 35 and 36 drivingly connected to shafts 38 and 39 respectively.

It should be understood that each of the hydraulic units 23 and 24, 35 and 36 is an axial piston hydraulic unit of well known configuration and those skilled in the art will readily appreciate the construction and operation so that a detailed description is not believed necessary.

The variable displacement hydraulic units 23 and 24 have cam members 115 and 115' each movable from zero displacement position to a first maximum displacement position on one side of zero and a second maximum displacement position on the other side of zero. Thus, reversible flow relative to the variable displacement hydraulic units is provided by movement of the cam members on either side of zero displacement which reverses the flow in the conduits (not shown in FIG. 1) interconnecting the variable displacement hydraulic units with the fixed displacement hydraulic units 35 and 36. In this manner, the direction and speed of rotation of the fixed hydraulic units 35 and 36 may be controlled.

As will appear hereinafter the hydraulic units are adapted to operate both as pumps and as motors depending upon the mode of the transmission selected.

Shafts 38 and 39 have gears 42 and 43 fixed thereto drivingly engaging external teeth on the ring gear 45 in the differential 19. Engaging internal teeth on ring gear 45 are a plurality of pinion gears 46 rotatably carried by a planetary gear carrier 47 fixed to shaft 49. A sun gear 51 meshes with the planetary pinions 46 and drives output shaft 21.

A first clutch 53 is provided for selectively connecting the ring gear 45 to the output shaft 21 in the low speed range of the transmission so that the differential 19 may be effectively locked and the power from the input shaft 14 to the output shaft 21 flows solely through the hydraulic transmissions 16 and 17. Clutch 53 is actuated by shift pistons or plungers 164 and 164', it being understood that any desired number of shift pistons may be provided.

A second clutch 55 is provided for selectively connecting the shaft 49 to be driven by input shaft 14. Toward this end gears 57 and 58 fixed to shafts 29 and 30 respectively, drivingly engage a large gear 60 carrying one of the clutch elements 61. Clutch 55 is actuated by shift pistons or plungers 160 and 160'. When clutch 55 is engaged and clutch 53 disengaged the transmission is placed in a differential-hydrostatic mode where power is delivered from the input shaft 14 to the output shaft 21 through both the hydraulic transmissions 16 and 17 and a mechanical power path through the clutch 55 and shaft 49.

A control system is provided for controlling the transmission 10 and the engine 11 so that the speed of the associated vehicle may be varied as desired. Toward this end, a control handle (or accelerator pedal) 62 is movable from a neutral position shown to program the throttle setting of an engine throttle 63 controlling the flow of fuel or air-fuel mixture to the engine 11. Control handle 62 also biases a main governor 65, driven by the engine 11, for controlling the speed ratio of the transmission 10 through a transmission and clutch control 66. As will be described in more detail below, a forward-reverse control handle 67 is provided for shifting a suitable valve in the transmission and clutch control 66 for selectively placing the transmission 10 in either a forward or reverse mode of operation.

Further, there is provided a pressure control lever 69 which, if desired, may be used at low engine speeds to override the effect of the main governor 65 and control transmission ratio in accordance with an operator selected system pressure in the hydrostatic portion of the drive at low speeds.

If desired, the control lever 69 may be mechanically linked to the throttle lever 62 so that at low engine speeds and power settings the output torque level of the transmission is limited by the pressure control and the hydrostatic system pressure limit varies directly with throttle setting.

Excluding the effect of the pressure control lever 69, when the engine 11 is running and the operator increases the engine throttle setting by moving the control lever 62 above the idling speed range of the engine, the main governor, after an increase in engine speed, through the transmission and clutch control 66 begins increasing the displacement of the variable displacement hydraulic units 23 and 24, which then act as pumps supplying fluid to the hydraulic units 35 and 36 then acting as motors.

Pistons 164 and 164' are in positions actuating clutch 53 and locking the differential 19. The shift pistons 160 and 160' are depressurized so that clutch 55 is disengaged. The engine speed then increases rapidly to a value dictated by the handle 62. The transmission is then in a low speed straight hydrostatic mode where the hydraulic units 23 and 24, acting as pumps, drive the units 35 and 36 in the same direction of rotation. Motors 35 and 36 drive the output shaft 21 through gears 42 and 43 respectively and differential 19, applying a load to the engine to maintain the engine speed at the value selected.

The main governor 65 in conjunction with the transmission control 66 controls the transmission ratio in a manner to maintain the selected engine speed so that if the engine speed is below that called for the transmission ratio (transmission output speed vs. transmission input speed) will be reduced (i.e. transmission output speed reduced with respect to transmission input speed) to let the engine gain speed and if the engine speeds above that called for the ratio will be increased to reapply the load. In this mode, the speed of shaft 21 is controlled by the displacement of the hydraulic units 23 and 24 and the speed of the engine without varying the ratio in the mechanical differential.

The transmission will stay in this low speed straight hydrostatic mode until the speed of the output shaft 21 slightly exceeds the speed of the input shaft 14, which occurs if the engine speed still tends to increase above that dictated by the setting of the handle 62, so that the displacement of units 23 and 24 tends to increase still further, thereby increasing the speed of the output shaft relative to the input shaft. When the speed of the output shaft slightly exceeds that of the input shaft, the transmission and clutch control 66 pressurizes shift pistons 160 and 160′, engaging clutch 55, and depressurizes the shift pistons 164 and 164′, disengaging clutch 53. This connects the input shaft 14 to drive shaft 49 and frees the differential 19. The gearing is selected with respect to the displacement of the hydraulic units so that when the variable displacement units are approximately in their maximum displacement positions, gear 60 and clutch element 61 will rotate at substantially the same speed as the power shaft 49 to achieve synchronous clutching, providing a smooth shift from the straight hydrostatic mode to the split differential mode.

After the shift, and for the first half the differential mode speed range, if the engine speed still tends to increase above the desired level the main governor and the transmission and clutch control 66 will cause a reduction in the displacement of the hydraulic units 23 and 24 which then begin to act as motors or metering devices for the fixed displacement units 35 and 36 respectively, which then act as pumps driven by gears 42 and 43 respectively.

With clutch 55 engaged and clutch 53 disengaged, the gear carrier 47 and the ring gear 45 rotate in the same direction so that the ring gear effectively subtracts speed from the differential as compared to the output speed when the ring gear is stationary. This occurs in the first part of the differential mode. As the displacement of the hydraulic units 23 and 24 is further reduced toward neutral, they provide a greater restriction to flow, and the speed of the hydraulic units 35 and 36 decreases, thereby subtracting less and less speed from the differential 19 permitting the output speed of shaft 21 to increase further. During this mode the speed of the hydraulic units 35 and 36 and the stroke of units 23 and 24 decrease toward zero.

During the second half of the differential mode speed range, in response to a continuing tendency of the engine speed to increase above that dictated by the throttle setting, governor 65 and transmission and clutch control 66 will cause the variable unit cams 115 and 115′ to reach their zero displacement positions and then reverse so that the fixed displacement units 35 and 36 will cease rotation inasmuch as the variable units 23 and 24 pass through zero displacement, thereby stopping rotation of the ring gear 45. The variable units 23 and 24 then act as pumps with the cams 115 and 115′ moving on the other side of neutral, driving units 35 and 36 again as motors but in a reverse direction. This causes ring gear 45 in the differential to reverse its direction of rotation so that it begins rotation opposite from the planet carrier 47 thereby adding speed to the differential and further increasing speed of output shaft 21. The speed of the transmission can then be increased in this mode until the maximum speed is obtained when the displacement of the hydraulic units 23 and 24 is full or maximum negative.

In bringing the output shaft 21 up to speed, the hydraulic units 35 and 36 are effectively used three times as they go through their speed range three times while the associated output shaft goes through its speed range once.

After the engine 11 reaches the speed dictated by the control lever 62, the main governor 65 and the transmission and clutch control 66 will assume an equilibrium position. The speed of the transmission may thereafter be decreased by shifting the control lever 62 back towards its neutral position shown in FIG. 1. The reduced throttle setting will cause the transmission to temporarily load the engine 11 and thereby effect a decrease in engine speed. That is, the reduced throttle setting causes the governor 65 and the transmission control 66 to increase system pressure by movement of cams 115 and 115′ toward neutral, resulting in an increase in load on the engine by the transmission, driving the engine speed down to the new lower level. As the engine speed falls slightly below the new value the governor 65 and the transmission control 66 will begin reducing the transmission ratio by reducing the displacement of the hydraulic units 23 and 24 (thus reducing transmission ratio in the upper portion of the differential hydrostatic mode) from their negative positions toward neutral and then again increase displacement on the other side of neutral if necessary.

If the load on the engine by the transmission is still greater than required to maintain engine speed at the reduced level, the main governor and the transmission control will place hydraulic units 23 and 24 approximately in maximum positive displacement and the speed of the output shaft 21 will fall to or below the speed of input shaft 14, and in response to this, transmission ratio and clutch control 66 engages clutch 53 and disengages clutch 55, placing the transmission again in the straight hydrostatic mode. At the same time the displacement cams 115 and 115′ are reversed moving them again toward neutral as required to remove the load from the engine to maintain the desired engine speed.

The reverse drive of the transmission is effected by moving the control handle 67 to the reverse position causing the transmission and clutch control 66, under the influence of the main governor 65, to move the cam members 115 and 115′ toward their maximum reverse positions in the straight hydrostatic mode. This permits about twenty percent of the maximum transmission speed to be obtained in reverse. No reversing gears or clutch actuations are necessary to place the transmission in reverse as it operates in the straight hydrostatic mode in the same manner as the low speed forward hydrostatic mode.

Figure 2:
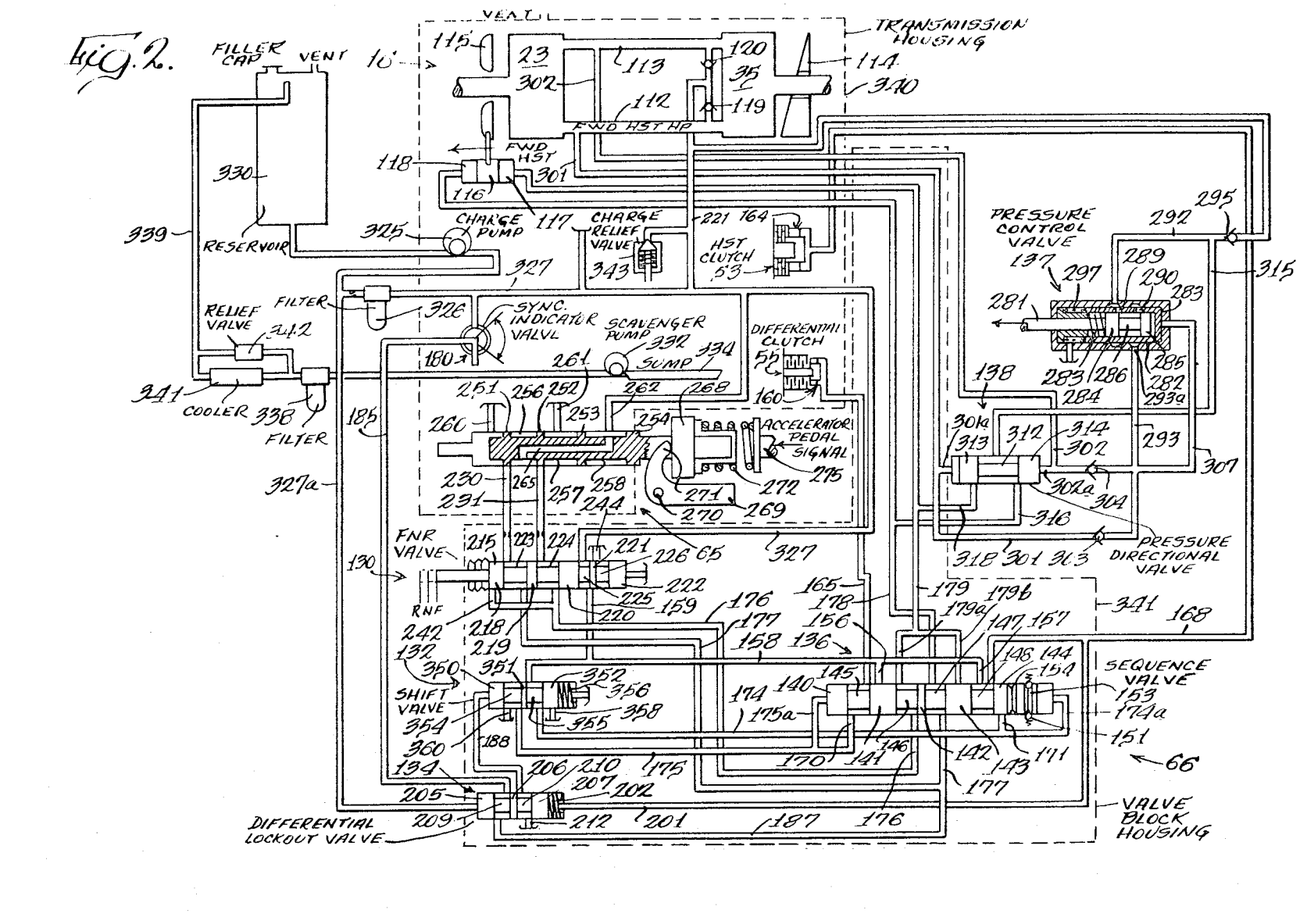
FIG. 2 is a hydraulic circuit shown only generally in FIG. 1 for controlling the displacement of the variable hydraulic unit and the mode changing clutches.
Figure 3:
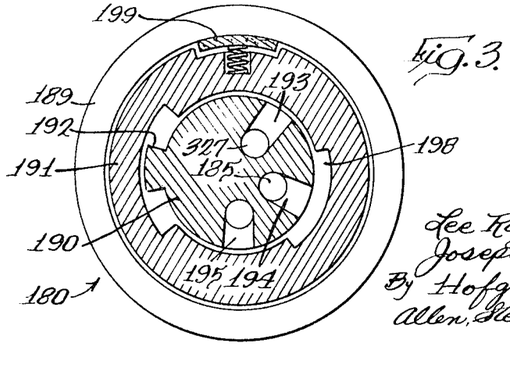
FIG. 3 is an enlarged cross-section of the synchronous indicator valve shown schematically in FIG. 2.

The following is a more detailed description of the present hydraulic control circuit with particular reference to FIGS. 2 and 3. It should be understood that only the hydraulic transmission 16 is shown in FIG. 2.

In the control circuit, the hydraulic transmission illustrated at 16 includes the variable displacement axial piston hydraulic unit 23 and the fixed displacement axial piston hydraulic unit 35 connected inclosed hydraulic circuit by means of conduits 112 and 113 adapted to function as connections leading from the outlet of the unit functioning as a pump to the inlet of the unit functioning as a motor and leading from the motor outlet to the pump inlet. The fixed unit 35 includes a fixed cam or swashplate 114 while the variable unit includes a variable cam or swashplate 115 movable in opposite directions from a zero displacement position illustrated under control of a double acting piston 116 in a control motor 33 having opposed chambers 117 and 118.

The closed hydraulic circuit interconnecting the hydraulic units 23 and 35 operates under varying conditions in which the conduit 112 is sometimes the high pressure conduit and the conduit 113 is sometimes the low pressure conduit while at other times the conduit 113 is at high pressure and the conduit 112 is at low pressure. In order to admit charge fluid to the circuit under either condition of operation, for purposes of makeup for leakage and lubricating fluid withdrawn, inlet check valves 119 and 120 communicate respectively with the conduits 112 and 113 and with charge fluid passage 121.

Charge fluid is supplied to passage 121 from a charge pump 325 whch delivers fluid through a charge filter 326 to charge and control pressure line 327. The charge pump 325 withdraws fluid from a reservoir 330 which is filled by a scavenge pump 332 from a sump 334. The scavenge pump 332 delivers fluid to the reservoir through a scavenge filter 338 and line or passage 339. A suitable cooler 341 may be provided in line 339 as well as a relief valve 342 which bypasses the cooler 341. The charge fluid in line 327 may be relieved by a suitable relief valve 343.

With reference to the control piston 116 for the variable unit 23, the transmission operation is initiated by pressurizing the chamber 117 to move the variable unit cam to full stroke in one direction. After the shift in mode, the chamber 118 is pressurized to move the variable angle cam back toward neutral and toward maximum angle in the opposite direction.

In order to control the movement of the control piston 116 and the clutches 53 and 55 as described above, the main governor 65 and transmission and clutch control 66 make use of valves which regulate the flow of control fluid under pressure from the source represented at 327 to the chambers 117 and 118 and to clutch shift pistons 160 and 164. These include a forward-reverse valve 130 (operable by lever 67 for controlling the direction of transmission operation), a shift valve 132 which provides a shifting signal when a change in transmission mode is necessary, a differential lockout valve 134 for preventing the initiation of a shift signal by the shift valve 132 until the speed of input shaft 14 reaches a predetermined level, a sequencing valve 136 for sequencing the operation of clutches 53 and 55 as well as reversing the direction of movement of cam 115 after the shift has occurred and a pressure control valve 137 for maintaining the pressure in conduits 112 and 113 at a low level during idling and if desired by the operator at a predetermined higher pressure value during low speed operation. A pressure directional control valve 138 is provided for determining which of the conduits 112 and 113 is at high pressure so that the pressure control valve 137 directs its control signal to the proper one of the chambers 117 and 118 to effect movement of the cam 115 in the proper control direction.

The sequencing valve 136 is adapted to control the clutch plungers 160 and 164 and to control the displacement varying piston 116 of the variable unit 23, the latter by controlling the supply of fluid to the chambers 117 and 118. The sequencing valve includes a valve plunger having lands 140, 141, 142, 143 and 144, with intervening reduced stem portions 145, 146, 147 and 148. As shown in the drawing the valve plunger is in its leftmost position which is the low speed mode position. For retaining the plunger in both its low speed mode position and its high speed mode position, a suitable detent assembly 151 is provided which is biased into one of the grooves 153 or 154 in the valve land 144. When the plunger is shifted to the right by fluid pressure as will be explained below the detent assembly 151 engages groove 154 and retains the valve plunger in its right position which is the high speed mode position.

The sequencing valve 136 has supply passages 156 and 157, the former being blocked by land 141 and the latter communicating with reduced stem portion 148 when the sequencing valve is in its left position shown in the drawing. Passages 156 and 157 receive charge fluid through line 158, passage 159, and forward-reverse valve 130 which controls communication with the charge fluid line 327.

As will appear below, supply passage 156 communicates and pressurizes passage 165, actuating clutch 55 when the valve is in its right high speed mode position. When the sequencing valve is in the position shown in the drawing supply passage 157 communicates with and pressurizes passage 168 actuating the clutch 53. When the sequencing valve shifts to its right position, land 143 blocks communication between supply passage 157 and passage 168.

For the purpose of selectively connecting one of the passages 165 and 168 to drain, drain ports 170 and 171 are provided and these are alternately connected to drain by the shift valve 132. In the left position of sequencing valve 136 drain passage 170 communicates with passage 165 and drain passage 171 is blocked from communication with passage 168 by land 144. In the right position of sequencing valve 136, drain passage 170 is blocked by land 140 and drain passage 171 communicates with passage 168 across reduced stem portion 148.

For the purpose of shifting the valve, control passages 174 and 175 are provided which communicate with the opposite ends of the sequencing valve 136 through branch passages 174a and 175a. The selective pressurization of passages 174 and 175 is controlled by the shift valve 132.

The sequencing valve 136 also functions to connect displacement control passages 178 and 179, which communicate respectively with control chamber 118 and control chamber 117, with passages 176 and 177 which are selectively pressurized and drained by the main governor 65 for the purpose of controlling the displacement of unit 23. In the left position of sequencing valve 136, passage 176 communicates with the control chamber 117 through branch passage 179a and passage 177 communicates with control chamber 118 across reduced stem portion 147 through passage 178. In the right position of the sequencing valve 136, passage 176 communicates with the control chamber 118 across stem 146 and passage 178, and passage 177 communicates with control chamber 117 across reduced stem portion 147 and branch passage 179b. As will appear hereinbelow, when the sequencing valve 136 shifts from the left low speed mode position shown to the right high speed mode position and a further increase in transmission ratio is required, the displacement cam 115 will be arrested near its maximum forward hydrostatic displacement position and will begin movement back toward its neutral position, shown in the drawing, to effect further increase in transmission output speed. Thus, when a change in mode is indicated the sequencing valve effectively reverses the control of the governor 65 on the displacement cam 115 so that it tends to rotate cam 115 in a counterclockwise direction after a shift to achieve a further increase in the transmission output speed.

To assure that the engine associated with the transmission remains loaded throughout a change in mode, the sequencing valve 136 sequences the action of clutches 53 and 55. Assuming the valve 136 to initially be in the position shown with the low speed mode clutch 53 engaged and the high speed mode clutch 55 disengaged and thereafter the sequencing valve receives a shift signal from shift valve 132 through passage 175, the high speed mode clutch 55 will be immediately actuated by charge fluid in line 170 pressurizing line 165, serving to shift the clutch actuation plungers 160 associated with clutch 55. At the same time, clutch 53 remains engaged because line 168 remains in communication with charge fluid supply passage 157. The clutch 55 becomes fully engaged before the pressure builds up sufficiently on the left end of the sequencing valve sufficiently to overcome the ball detent 151 and at that time the plunger snaps to its right position.

In the right position of the valve plunger, passage 170 is blocked by land 140, but the passage 165 remains pressurized by communication with supply passage 158 across reduced stem portion 145 so that the high speed mode clutch 55 remains engaged. The low speed mode clutch 53 then disengages since passage 168 communicates with passage 171 across reduced land portion 148, passage 171 then being connected to drain by the shift valve 132.

The sequence valve 136 is shifted from its right position back to the position shown in the drawing when passage 174 is again pressurized and the passage 175 depressurized by the shift valve 132 causing a buildup of pressure on the right end until the detent 151 is overcome which places the transmission in the low speed mode.

It will be understood from the description above, that when the sequencing valve plunger occupies the leftmost position, the clutch plunger 164 is pressurized and the displacement varying chamber 117 is pressurized to put the transmission into operation in the straight hydrostatic mode. Assuming the main governor valve 65 calls for a transmission ratio greater than that obtainable in the "low gear" hydrostatic mode (to control the engine), when the displacement varying piston 116 reaches the end of its stroke, the shift valve plunger moves to its rightmost position, causing disengagement of clutch 53 and engagement of clutch 55 in sequential manner, as described above. This effects the shift in mode to combined hydrostatic and mechanical operation and the movement of the displacement varying means is reversed to obtain an increase in transmission output speed in the combined hydrostatic and mechanical mode of operation.

When the main governor valve 65 calls for reduction in ratio of the transmission after the transmission has been placed in the high speed mode, the valve 65 will reverse the pressure conditions in passages 176 and 177 so that passage 179 becomes pressurized and passage 178 becomes de-pressurized supplying fluid to chamber 117 and draining chamber 118 so that the displacement varying means begins to move backwardly through its previous stages of operation.

Continuing, when the displacement varying piston 116 approaches the end of its stroke toward the left in the combined hydrostatic and mechanical mode (high speed mode) as the transmission ratio is being reduced, a shifting signal will be provided from shift valve 132 raising the pressure against the right end of the sequencing valve and lowering the pressure against the left end until the valve snaps back to the position shown in the drawing.

For the purpose of providing the shifting signals to the sequencing valve 136, a synchronous indicator valve 180 is provided which acts in conjunction with the shift valve 132 and the differential lockout valve 134 to provide these signals. The action of the synchronous indicator valve 180 is dictated by the speeds of input shaft 14 and the output shaft 21 of the transmission. In the pure hydrostatic mode, the input shaft speed is greater than or equal to the output shaft speed, whereas in the combined hydrostatic and mechanical mode, the output shaft speed is greater than the input shaft speed. As will be explained in more detail with reference to FIG. 3, one section of the synchronous indicator valve is mechanically linked to the input shaft and one section is linked to the output shaft.

In the pure hydrostatic mode, the synchronous indicator valve is positioned so that charge fluid in passage 327 is blocked from entry into passage 185. When the output shaft speed increases to a point where it is slightly higher than the input driven shaft speed, the indicator valve moves to a position where charge fluid from passage 327 is open to passage 185. Fluid in passage 185 flows through the differential lock-out valve 134 and into passage 187 and 177, through the sequencing valve 136 across reduced stem portion 147, pressurizing control chamber 118 and therefore stopping movement of the piston 116 and swashplate 115. This action limits the output speed of the transmission to the speed of the input driven shaft until differential lock-out valve 134 is actuated.

To initiate the change of mode, the variable unit speed must reach a preset point to actuate the differential lock-out valve 134, as will be explained in more detail below. When the differential lock-out valve is actuated, the pressurization of line 185 causes the pressurization of line 188 and the shifting of shift valve 132 providing a shift signal to sequencing valve 136 effecting a change in mode of the transmission.

Referring to FIG. 3 for a more detailed description of the synchronous indicator valve 180, an outer sleeve member 189 is adapted to be connected to the output shaft 21. An inner cylindrical valving member 190 is connected to be driven by the input shaft 14. An intermediate annular member 191 between the sleeve 189 and the inner member 190 is free to move a fixed amount relative to the inner member 190 due to the lost motion driving projection 192 on inner member 190. The inner member is provided with a first port 193, a second port 194, and a third port 195 communicating respectively with charge line 327, passage 185, and a suitable drain. Selective communication between port 194 and ports 193 or 195 is effected through a recess 198 in the intermediate member 191. As the outer member 189 is rotated relative to the inner member 190, the intermediate member 191 moves with the outer member 189 due to the friction between a spring loaded shoe 199 carried by the intermediate member 191 and engaging the outer member 189. The intermediate member 191 continues movement with the outer member 189 until projection 192 prevents further movement between the inner member 190 and the intermediate member 191 and then the intermediate member 191 slips relative to the sleeve 189.

Thus, assuming counterclockwise rotation of both the outer sleeve 189 and the inner member 190, the frictional drag caused by shoe 199 will maintain the intermediate member 191 in its most clockwise position with respect to the inner member 190, thereby communicating ports 194 and 195 and thus passage 185 with drain. As soon as the speed of sleeve 189 exceeds the speed of inner member 190, the frictional drag of shoe 199 will reverse causing the intermediate member 191 to move to its most counterclockwise position with respect to inner member 190, thereby communicating port 194 with pressure port 193 and thus pressurizing passage 185 and providing the synchronous signal in that passage necessary to effect shifting.

The differential lock-out valve 134 is a pressure operated valve which receives its signal from the charge pump 325 through charge passage 327a. The charge pump 325 is driven by the input shaft 14 and its flow, therefore, is directly proportional to input shaft speed. The pressure in passage 327, however, is substantially constant and therefore the pressure in passage 201, acting on the right end of valve 134 with spring 202, is also substantially constant. When the input shaft speed reaches a preset value, the pressure in passage 327a becomes greater than the charge fluid pressure in passage 201 and the pressure of spring 202 and the differential lockout valve 134 is pushed from its lock-out position shown to a new rightmost position, compressing the spring 202.

The differential lock-out valve 134 includes a valve plunger having lands 205, 206 and 207 defining reduced stem portions 209 and 210. In the left position shown in the drawing, land 206 blocks communication between synchronous indicator valve passage 185 and passage 188 leading to the shift valve 132 so that a shift signal is prevented. Passage 185 is permitted communication with passage 187 across reduced stem portion 209 so that the swashplate 115 may be arrested upon synchronism, even though the input shaft does not reach the predetermined minimum speed for shifting from the low speed mode to the high speed mode. Reduced stem portion 210 permits communication between passage 188 and the drain 212 so that the shift valve 132 remains in its left position shown when the lock-out valve is not actuated. When the lock-out valve 134 is in its rightmost or actuated position, valve land 205 blocks passage 187 and reduced stem portion 209 communicates passage 185 and passage 188, readying the shift valve 132 for a shift signal from the synchronous indicator valve 180.

The shift valve 132 is a pressure operated valve which actuates upon a signal from the synchronous indicator valve 180 through the differential lock-out valve 134. The valve includes a plunger having lands 350, 351 and 352 defining reduced stem portions 354 and 355. A spring 356 biases the valve plunger to its left deactuated position. In the deactuated position shown in the drawing, charge fluid from passage 159 passes across stem portion 355 to passage 174 and the right end of the sequencing valve 136. The passage 175 communicates with a drain 360 across reduced stem portion 354. The left position of the valve plunger is the low speed straight hydrostatic position.

Upon receipt of a shift signal in passage 188 from the synchronous indicator valve through the differential lock-out valve 134 the plunger of shift valve 132 will move to the right against the biasing force of spring 356.

Charge fluid then flows across reduced stem portion 354 into passage 175 providing a shift signal against the left end of the sequencing valve. At the same time the right end of the sequencing valve 136 through passage 174A and passage 171 communicates with a drain 358 across reduced stem portion 355. The shift valve remains in this right position so long as a shift signal continues from the synchronous indicator valve in passage 185. When the speed of the output shaft 21 falls below the speed of the input shaft and passage 185 is depressurized causing the pressure to fall in passage 188, the shift valve 132 will move to its left deactuated position under the influence of spring 356 causing a pressurization of passage 174 and a depressurization of passage 175 shifting the sequencing valve 136 back to its low speed mode left position described above.

The forward-neutral-reverse valve 130 is a manually operated three position valve which directs governor control pressure to the control chambers 117 and 118 and therefore controls the forward-reverse direction of the transmission output. It also disengages the clutches 53 and 55 when the valve plunger is moved to a neutral position. This valve consists of a valve plunger 215 selectively held in one of the three positions by a suitable detent arrangement 151. The valve plunger has lands 218, 219, 220, 221 and 222 defining reduced stem portions 223, 224, 225 and 226. When the valve 130 is in the forward position, as shown in the drawing, the transmission is in the straight hydrostatic mode and control fluid from the governor 65 is directed through passage 230 across reduced stem 223, passage 177 to the control chamber 118, and governor control fluid in passage 231 is directed across reduced stem 224 and passage 176 to the control chamber 117.

Charge fluid in passage 327 is directed across reduced stem 225 to passage 159 and the shift valve through passage 174, and the sequencing valve through passage 158. With the valve 130 in its neutral position, the control passages 230 and 231, as well as the charge fluid passage 327, are deadheaded by the lands 218, 219 and 220. Passage 159 is then connected to a drain across stem 226 which drains passage 158 and disengages clutch 53, so that in the neutral position both clutches are disengaged, and the speed governor can have no control over the transmission.

With the valve 130 in its reverse position, governor control fluid in passage 230 is directed through passage 242, passage 179 to chamber 117, and governor control fluid in passage 231 is directed through passage 177 to the control chamber 118. Charge fluid in passage 327 is directed to passage 159 and distributed to the shift valve 132, the sequencing valve 136, and finally to the clutch 53 causing actuation of this clutch. Drain passage 244 is blocked by land 222 in this position.

Referring now to the main governor 65, it will be recalled that this governor normally controls the displacement of the hydraulic unit 23 during both the low speed mode and the high speed mode, except when the pressure control valve 137 assumes control of hydraulic unit displacement at idling and very low transmission output speeds. The governor valve consists of a movable plunger including lands 251, 252, 253 and 254 which define reduced stem portions 256, 257 and 258. The plunger is slidable in a valve bore which communicates with drain ports 260 and 261 as well as a charge fluid port 262 which communicates with the charge fluid line or passage 327. The valve plunger includes an internal passage 265 opening at one end to the reduced stem portion 258 and at the other end to the reduced stem portion 256 between lands 251 and 252 for the purpose of supplying fluid to the passages 230 and 231 selectively.

In operation, the governor valve sleeve rotates in a conventional manner with a head 268 driven by suitable gearing connected with the vehicle engine and carrying flyweights 269 pivoted on the head as at 270. The flyweights include extension arms as at 271 which tend to move the valve plunger toward the right with increasing engine speed in opposition to a main spring 272 which tends to urge the valve plunger to the right. The main spring is compressible by means of a manually controllable plunger 275 which acts against the spring 272.

The plunger 275 is connected through suitable linkage with the engine accelerator pedal or lever 62 which is manually operable to simultaneously adjust fuel flow or throttle opening and governor spring pressure. The accelerator lever 62 is also connected to lever 69 which controls the pressure control valve 137 so that they are connected in parallel. The accelerator pedal is manually operable to simultaneously adjust fuel flow or throttle opening and increase governor and pressure control valve spring pressure. As the engine speed is increased, the flyweight pressure against the spring 272 is increased until a state of relative equilibrium at the desired power level exists.

Except initial starting and final stopping, the operation of the governor valve may be explained as follows without considering the effect of the pressure control valve 137. Depression of the accelerator pedal 62 calls for an increase in engine speed by increasing governor spring bias and increasing the throttle opening. As a result of the responding speed increase, the flyweights move the plunger to the right. Land 252 uncovers passage 231 and charge fluid is orificed into passage 231. Simultaneously, land 251 uncovers passage 230 to drain 260 and control fluid in passage 230 flows to drain. This governor stem action increases the pressure in passage 231 and decreases the pressure in passage 230. Since these two passages connect with chambers 117 and 118, respectively, in the pure hydrostatic mode, piston 116 will move toward the left, putting the swashplate 115 into stroke and creating output shaft torque and speed. If the engine fuel setting is constant, but the output load is increased to where the engine speed tends to drop, the governor flyweights 269 allow the stem to move to the left, which moves the position of lands 251 and 252 in relation to the passages 230 and 231 so that pressure in passage 231 is reduced and the pressure in passage 230 is increased. This has the net effect of reducing the stroke of the swashplate 115 and therefore, unloading the engine so that it can maintain its initial power setting.

If a higher power setting is required, the throttle setting and governor spring bias are manually increased simultaneously. This has the net effect of moving the governor stem to the left initially, thus moving the swashplate 115 to a smaller stroke, allowing the engine speed to increase and to obtain the desired power setting. As the engine speed increases, the flyweights move the stem to the right and therefore, again, moving swashplate 115 into a different stroke to transmit the higher power setting to the output of the transmission.

At very low output speeds, the power setting of the engine does not determine the torque output of the transmission. Moreover, it is sometimes desirable to keep the conduits 112 and 113 at very low pressure such as at idle. Toward this end, the pressure control valve 137 and the pressure directional valve 138 control the displacement of the hydraulic unit 23 in response to pressure variations in the conduits 112 and 113. The pressure control valve 137 is a manually operated pressure controlled valve which limits the pressure in the main conduits 112 and 113 by controlling the position of swashplate 115. This valve consists of an inner plunger 281 slidable in an outer plunger 282 which is in turn slidable within a housing 283. The inner plunger 281 has lands 284 and 285 defining a reduced stem portion 286, and the inner plunger is biased toward the righ-hand end of the plunger 282 by a spring 283. The plunger 282 has ports 289 and 290 therein. In the right-hand position of the plunger 282 shown in the drawing, port 289 communicates with passages 292 and port 290 is just out of communication to the right of port 293a in the housing communicating with passage 293.

Passage 292 communicates through a check valve 295 with passage 221 and relief valve 343. The plunger 282 is biased to its rightmost position by a spring 297 in housing 283.

For the purpose of making the valve 137 responsive to pressure in the conduits 112 and 113, passages 301 and 302 communicate respectively with the main passages 112 and 113 and also communicate through check valves 303 and 304 with passage 307 which opens within the right end of housing 283. Thus, pressure in passage 307 tends to urge plunger 282 to the left.

Working in conjunction with the pressure control valve 137 is the pressure directional valve 198 which is a two position pressure operated valve consisting of a plunger 312 having lands 313 and 314. The plunger 312 moves to its right position shown when the pressure in main conduit or passage 112 exceeds that in 113 as the left end of valve 138 communicates with passage 301 through branch passage 301a and the right end of the valve communicates with passage 302 through branch passage 302a. When the pressure in passage 113 exceeds that in 112, the valve plunger shifts to the left, since the pressure in passage 302a exceeds that in passage 301a.

If during idling of the transmission, the main conduit 112 has a slightly higher pressure than conduit 113, this high pressure fluid flows through passage 301 pushing the valve 138 to the right and opens check valve 303, and this fluid enters the pressure control valve through passages 293 and 307. Fluid pressure acting on the right end of plunger 282 causes it to move slightly leftward opening port 290 permitting flow from passage 293 across the valve stem 286 and out of port 289, through passage 292 and passage 315 to the pressure directional valve 138. Valve 138 directs this flow through line 116 to line 178 and control chamber 118 pushing the piston 116 to the right. This action reduces the high pressure in conduit or passage 112.

If a high pressure occurs in passages 113 during idling, this fluid exits through passage 302 shifting directional valve 138 to the left and passes across check valve 304 to both the passages 293 and 307. In the same fashion as described before for the higher pressure in main passage 112, pressure acting on the right end of valve plunger 282 shifts it slightly to the left again opening port 290 to passage 293 permitting flow from the passage 293 to the interior of the valve and out port 289 to passage 292, passage 315 and the directional valve 138. Since the directional valve is then in its leftmost position, it will direct fluid through passage 318 to control passage 179 supplying fluid to control chamber 117 which moves the piston 116 toward the left until the cam 115 assumes a position to reduce the pressure in conduit 113.

For the purpose of permitting system pressure in the conduits 112 and 113 to increase during normal operation of the transmission under the control of the governor 65, and for the purpose of maintaining the pressure in one of the main conduits 112 and 113 at a desired higher pressure level, the plunger 281 may be manually shifted toward the left, thereby covering port 290 so that no fluid pressure is permitted to enter the interior of the valve and exit through port 289, as described above, and therefore no fluid pressure signal is permitted to enter the control chambers 117 or 118 from the control pressure valve until the pressure in one of the conduits 112 or 113 reaches a level determined in accordance with the position of the plunger 281. When the desired pressure level is obtained, the fluid entering through line 307 will shift the valve plunger 282 sufficiently so that the port 290 passes valve plunger land 285 uncovering port 290 and permitting flow from passage 293 to the interior of the valve. This allows fluid pressure to enter the appropriate one of the control chambers 117 or 118 in the manner described above, to keep the swashplate at the appropriate angle to maintain the desired high pressure.

As described above, at very low output speeds, the power setting of the engine does not determine the torque output of the transmission, but rather the pressure control valve 137 effects this function. The main governor plunger 275 and the pressure control plunger 281 are both operated by the throttle lever 62. Suitable linkage means may be provided for alternatively operating the pressure control lever 69 independently of the throttle lever for limiting system pressure independently of engine speed, if desired.

When the accelerator pedal is depressed at very low engine speeds, the governor 65 will tend to move the swashplate 115 to a displacement or stroke which will generate a pressure level to the maximum capability of the hydraulic unit 35, if there is a significant output load. The linkage between the throttle and the plunger 281, which is arranged to shift the plunger 281 to the left in response to increased throttle settings, is therefore arranged so that the pressure control valve determines the displacement of the hydraulic unit 23 at low speeds and increases the predetermined pressure level in the conduits 112 and 113 as the throttle setting is increased. The linkage is also arranged so that after a predetermined low throttle setting the pressure control valve 137 will permit maximum pressures in the conduits 112 and 113 and thereafter the main governor 65 will assume control of the displacement of the hydraulic unit 23, as described above. Thus, at low speed, the pressure level in the main conduits 112 and 113 will vary directly with throttle setting and the output torque level will be limited by the pressure control valve 137. At higher output speeds when the main governor 65 assumes control, the output torque is limited by engine horsepower instead of system pressure level and the pressure control valve 137 serves no function.

As indicated in FIG. 2, the portions of the present transmission that are inside a suitable transmission housing (not shown) are within the dashed line 340 and the portions of the transmission that are inside a valve block housing are shown within the dashed line 341, although this forms no part of the present invention.

What is claimed is:

1. A hydrostatic transmission, comprising: a first hydraulic unit, a second hydraulic unit, conduit means interconnecting the hydraulic units, means for varying the displacement of one of said units to vary the speed ratio of the transmission, control means for said displacement varying means including means responsive to the fluid pressure in said conduit means for controlling the displacement of said one unit in a low speed range, means for varying said pressure responsive means, and means responsive to the speed of one of said units for varying the displacement of said one unit in an upper speed range.

2. A hydrostatic transmission as defined in claim 1, including an input shaft, an output shaft, said means responsive to speed including a governor responsive to the speed of said input shaft and controlling said displacement varying means, manually operable means for varying the setting of said governor to control the relationship between input shaft speed and unit displacement, said pressure responsive means including manually operable means for selecting a desired pressure limit in said conduit means.

3. A hydrostatic transmission as defined in claim 2, including an engine for driving said input shaft, throttle means for said engine, a throttle control for said throttle means, means interconnecting said throttle control and said governor, manually operable means to vary the governor setting with throttle setting, means interconnecting said throttle control and said pressure and manually operable control to vary said pressure limit in the conduit means as a function of throttle setting.

4. A hydrostatic transmission as defined in claim 1, wherein said displacement varying means is movable from a neutral position, said pressure responsive means maintaining the pressure in said conduit means at a predetermined low value during idling if movement of the displacement varying means from neutral at that time tends to increase pressure in said conduit means.

5. A hydrostatic transmission as defined in claim 1, including an input shaft drivingly connected to one of said units, an output shaft, differential gearing including a first gear, a second gear, and a control gear for varying the speed of the second gear with respect to the first gear, said second gear being drivingly connected to said output shaft, the other of said units being drivingly connected to the control gear, first clutch means for said differential gearing providing a power path from the input shaft to the output shaft only through said pump and motor units, and second clutch means for said differential gear providing a split power path both through the pump and motor units and directly from the input shaft to said first gear.

6. A hydrostatic transmission, comprising: an input shaft for transmitting power to the transmission, an output shaft for delivering power from the transmission, a first hydraulic unit, a second hydraulic unit, conduit means interconnecting said hydraulic units, means interconnecting said units to transmit power between said input shaft and said output shaft for providing at least two speed ranges for said transmission, clutch means for said selective gearing effective to determine the speed range desired, control means for said clutch means including sensing means providing a signal to said clutch means at the desired time for clutch actuation, and means responsive to the speed of said input shaft for preventing said clutch actuating signal when the input shaft is below a predetermined speed.

7. A hydrostatic transmission as defined in claim 6, wherein said sensing means includes means for sensing the relative speeds of said input shaft and said output shaft and providing said signal at a predetermined relative speed.

8. A hydrostatic transmission as defined in claim 6, including a shift valve for providing a fluid signal to activate said clutch means, said means for preventing the actuating signal including a lockout valve between said sensing means and said shift valve, and means for sensing the speed of the input shaft and providing a fluid signal to said lockout valve substantially proportional to input shaft speed, said lockout valve at a predetermined input shaft speed connecting said shift valve to receive an actuating signal from said sensing means.

9. A hydrostatic transmission as defined in claim 8, including fluid operable means for varying the displacement of one of said hydraulic units, said displacement varying means being movable from a neutral position to a maximum displacement position to increase the speed of said output shaft and from the maximum displacement position toward neutral to further increase the speed of said output shaft, valve means for supplying control fluid to said fluid operable means, said valve means being responsive to said shift valve to reverse the direction of movement of the displacement varying means upon the occurrence of a clutch actuating signal.

10. A hydrostatic transmission as defined in claim 9, wherein said valve means also controls the flow of control fluid to said clutch means.

11. A hydrostatic transmission, comprising: an input shaft, an output shaft, a first hydraulic unit, a second hydraulic unit, conduit means interconnecting the first and second hydraulic units, means interconnecting said first and second hydraulic units to deliver power from said input shaft to said output shaft including selective gearing providing a low speed range and a high speed range, clutch means for said selective gearing, and means for actuating said clutch means including means for sensing the relative speed of rotation of said input shaft with respect to said output shaft, said sensing means providing a clutch actuation signal when said relative speed reaches a predetermined value.

12. A hydrostatic transmission as defined in claim 11, wherein said sensing means is a fluid valve, said valve having a first member driven by said input shaft and a second member driven by said output shaft.

13. A hydrostatic transmission as defined in claim 12, said sensing valve including a supply port in one of said members for supplying fluid, an outlet port in said one member, and a drain port in said one member, a third valve member between said first and second valve members for selectively connecting said outlet port with either said drain port or said supply port, a lost motion driving connection between said third member and one of said members, and a frictional driving connection between said third member and the other of said members arranged so that as the speed of the output shaft exceeds the speed of the input shaft the third member shifts connecting the output port with said supply port, said output port being connected to provide said clutch actuation signal.

14. A hydrostatic transmission as defined in claim 13, said first member being a sleeve member, said second member being a cylindrical member rotatable within said sleeve member, said third member being a sleeve member and positioned between said first and second members, said lost motion connection being between said second member and said third member, and frictional driving means between said first member and said third member so that the first member retards rotation of said third member until the speed of the first member equals the speed of the second member.

15. A hydrostatic transmission, comprising: an input shaft, an output shaft, a first hydraulic unit, a second hydraulic unit, conduit means interconnecting said first and second hydraulic units, means interconnecting said hydraulic units to transfer power from said input shaft to said output shaft including selective gearing for placing the transmission in a low speed range or an upper speed range, first and second clutch means for said gearing selectively engageable to place the transmission in one of the two ranges, means providing a shifting signal at the desired time of shift from the low speed range to the upper speed range, and sequencing means responsive to said signal for first engaging one of said clutches and thereafter disengaging the other of said clutches so that the input shaft remains loaded throughout the shift.

16. A hydrostatic transmission as defined in claim 15, wherein said sequencing means includes a sequencing valve having a first low speed position and a second high speed position, said sequencing valve in the low speed position directing fluid to the first clutch means to maintain the first clutch engaged, said sequencing valve in the high speed position directing fluid to the second clutch means to maintain the second clutch engaged, said sequencing valve being responsive to a shift signal to move from said first position to said second position, said sequencing valve having means capable upon receipt of a shift signal when in the first position for directing fluid to actuate said second clutch prior to movement of the valve to the second position whereby the second clutch is engaged before the first clutch is disengaged.

17. A hydrostatic transmission as defined in claim 16, wherein said shift signal is provided by a shift valve movable from a first low speed position to a second high speed position, said shift valve in said first position directing fluid to one side of said sequencing valve to maintain it in the first position and when in the second position directing fluid to the other side of the sequencing valve to maintain it in the second position.

18. A hydrostatic transmission as defined in claim 16, including means for holding said sequencing valve in the first position, and means for holding said sequencing valve in the second position.

19. A hydrostatic transmission as defined in claim 16, including fluid operable means for varying the displacement of one of said units to bring the transmission up to speed, governor means for controlling the supply of fluid to said fluid operable means, said sequencing valve being connected between said governor means and said fluid operable means and constructed to reverse the effect of the governor means on the fluid operable means when the sequencing valve moves from the first to the second position upon receipt of a shift signal whereby the displacement varying means will move in the opposite direction after the shift signal to achieve a further increase in output shaft speed.

20. A hydrostatic transmission, comprising: an input shaft, an output shaft, a first hydraulic unit, a second hydraulic unit, first conduit means for delivering fluid from the first unit to the second unit and second conduit means for delivering fluid from the second unit to the first unit, fluid operable means for varying the displacement of one of said hydraulic units, said displacement varying means being movable from a neutral position, means for controlling the flow of fluid to said fluid operable means to vary the transmission speed, and means for maintaining the pressure in said first and second conduit means at a low value when the input shaft is idling or at low speeds including means responsive to pressure in said conduit means above a predetermined value for providing a displacement control signal, and a directional valve for directing said displacement signal to the fluid operable means in a direction to reduce the pressure in the higher pressure one of said conduit means.

21. A hydrostatic transmission as defined in claim 20, wherein said means for controlling the fluid operable means is the normal displacement control, said pressure responsive means being arranged to control displacement of said one unit only at low or idling speeds.

22. A hydrostatic transmission as defined in claim 20, wherein said pressure responsive means includes a torque valve for determining the desired pressure in the high pressure one of said conduit means, and manually operable means for biasing said torque valve and determining the pressure level in the high pressure one of said conduit means at low output shaft speeds.

23. A hydrostatic transmission, comprising: a first hydraulic unit, a second hydraulic unit, conduit means interconnecting the hydraulic units, means for varying the displacement of one of said units to vary the speed ratio of the transmission, control means for said displacement varying means including means responsive to the fluid pressure in said conduit means for varying the displacement of said one unit in a low speed range, means for varying said prssure rsponsive means, means responsive to the speed of one of said units for varying the displacement of said one unit in an upper speed range, an input shaft, an output shaft, said means responsive to speed including a governor responsive to the speed of said input shaft and controlling said displacement varying means, manually operable means for varying the setting of said governor to control the relationship between input shaft speed and unit displacement, said pressure responsive means including manually operable means for selecting a desired pressure level in said conduit means, means interconnecting said units to transmit power between said input shaft and said output shaft for providing at least two speed ranges for said transmission, clutch means for said selective gearing effective to determine the speed range desired, control means for said clutch means including sensing means providing a signal to said clutch means at the desired time for clutch actuation, means responsive to the speed of said input shaft for preventing said clutch actuating signal when the input shaft is below a predetermined speed, said sensing means including means for sensing the relative speeds of said input shaft and said output shaft and providing said signal at a predetermined relative speed, said clutch means including means for sensing the relative speed of rotation of said input shaft with respect to said output shaft, said sensing means providing a clutch actuation signal when said relative speed reaches a predetermined value, wherein said cluach means includes first and second clutch means for said gearing selectively engageable, and sequencing means responsive to said signal for first engaging one of said clutches and thereafter disengaging the other of said clutches so that the input shaft remains loaded throughout the shift.

References Cited

UNITED STATES PATENTS

| | | | |
|---|---|---|---|
| 2,620,679 | 12/1952 | Issigonis et al. | 74—867 |
| 2,899,834 | 8/1959 | Polomski | 74—867 |
| 3,204,486 | 9/1965 | De Lalio | 74—687 |
| 3,212,358 | 10/1965 | De Lalio | 74—687 |
| 3,369,430 | 2/1968 | Haley | 74—752 |

ARTHUR T. McKEON, Primary Examiner

U.S. Cl. X.R.

74—867